Nov. 2, 1937. A. W. MALL ET AL 2,097,731
CLUTCH MECHANISM
Original Filed May 9, 1935  2 Sheets—Sheet 1
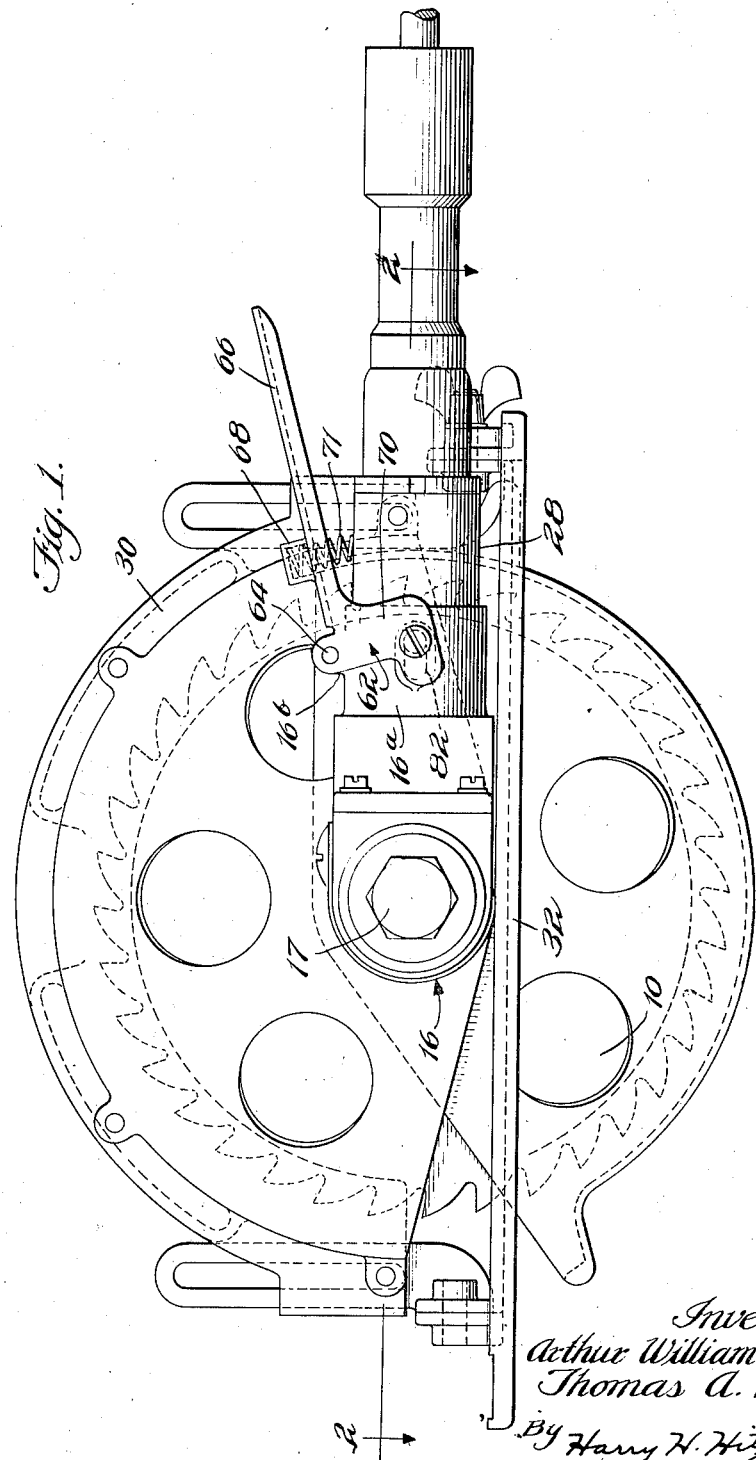

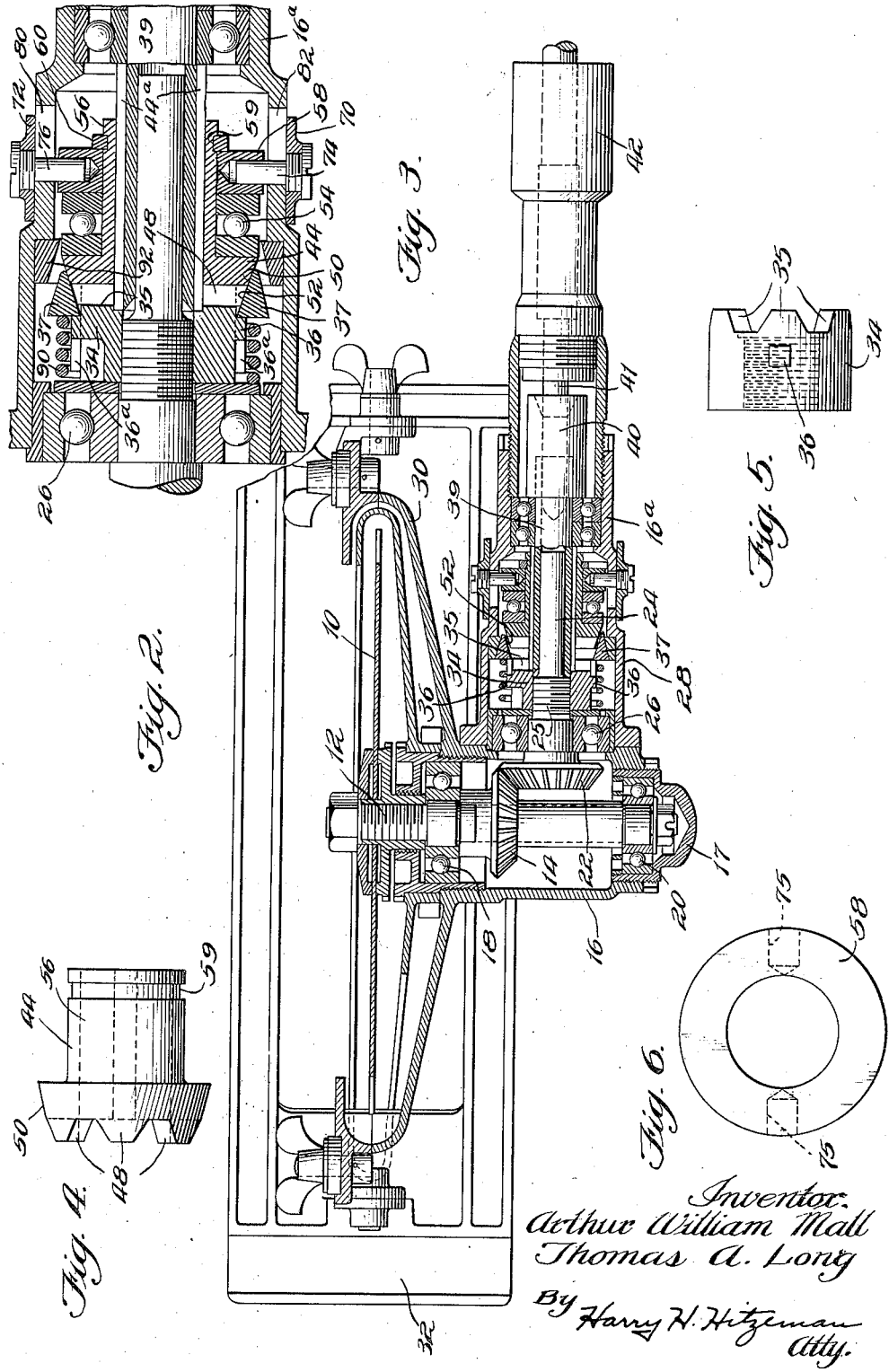

Patented Nov. 2, 1937

2,097,731

UNITED STATES PATENT OFFICE 2,097,731

CLUTCH MECHANISM

Arthur William Mall and Thomas A. Long, Chicago, Ill., assignors to Mall Tool Company, a corporation of Illinois Application May 9, 1935, Serial No. 20,648
Renewed April 20, 1937

3 Claims. (Cl. 192—18)

Our invention relates to improvements in clutch mechanism and similar devices.

Our invention relates more particularly to a clutch mechanism having friction and positive engaging means adapted to provide a quick-acting, easily manipulated clutch.

The principal object of our invention is to provide an improved clutch mechanism capable of use with a flexible drive shaft, although, of course, it is an improved clutch of general application and it may be used in many other suitable ways with rigid drive shafts.

A further object of the invention is to provide a comparatively quick-acting clutch mechanism whereby manipulation of a hand lever acts to engage or disengage the clutch elements.

A further object of the invention is to provide clutch elements having friction engaging portions for primary engagement and positive interlocking elements arranged to come into action following the primary engagement, and improved braking means for quickly stopping movement of the driven clutch member upon releasing the driving engagement.

A further object of the invention is to provide an improved quick-acting, positive clutch that is easily constructed and one which is capable of long and continued use without becoming broken or out of order.

Other objects and advantages will be more apparent from the following description wherein reference is made to the accompanying two sheets of drawings upon which, Fig. 1 is a side view of a drive shaft and mechanism driven thereby, showing the clutch operating lever upon the housing of the drive shaft;

Fig. 2 is a horizontal sectional view taken generally on the line 2—2 of Fig. 1;

Fig. 3 is an enlarged view of the clutch parts in a changed or clutch-engaging position;

Fig. 4 is a side elevational view of the driving clutch member;

Fig. 5 is a plan elevational view of the driven clutch member; and

Fig. 6 is a front elevational view of the shifting ring.

In the drawings, we have chosen to illustrate one embodiment of our invention in connection with a portable assembly. We have shown a disc saw 10 securely fastened upon the end of a stub-shaft 12 of a bevel gear 14. The bevel gear and stub-shaft are suitably supported in the upper and lower ends of gear housing 16 by ballbearing members 18 and 20. The lower member 20 is mounted in a cap member 17 which closes the lower end of the gear housing. The bevel gear 14 meshes with a similar bevel gear 22 mounted at the end of a stub-shaft 24 journalled in suitable ballbearings 26 in a lateral extension 28 of the housing 16. A suitable saw frame 30 surrounds the saw member 10 and is mounted upon a guide platform 32 for adjustment of the saw to secure the desired depth of cut. Since the details of this construction have no bearing on the invention, they will not be further described.

The drive for the saw, as previously mentioned, is obtained by means of the bevel gears 14 and 22. The bevel gear 22 may have a clutch member 34 screw-threadedly mounted upon the portion 25 thereof, the clutch member 34 being formed with a plurality of teeth 35 disposed upon its end wall. The clutch member is further provided with a pair of square projections 36 which form guides for a cone-clutch member 37 that is slidably and telescopically positioned on the clutch member 34. The shaft 24 is telescopically mounted in a tubular member 39 which is formed at its forward end with a nut portion 40 to engage the forward rigid tip 41 of a flexible shaft (not shown), which is connected to the end of the collar member 42 in any suitable manner to provide a driving action for the shaft 24.

A second clutch member 44 is provided, slidably mounted upon the tubular member 39. Key members 44a provide a driving connection between these parts. The clutch member 44 is also provided with teeth 48 adapted in a clutch engaging position to engage in the complementary teeth 35 of the clutch member 34. The clutch member 44 is further provided with the tapered portion 50 which is capable of engaging in the cone-shaft opening 52 of the cone-clutch member 37. A suitable ballbearing race 54 is mounted upon the hub 56 of the clutch member 44 and is disposed between the forward end of the clutch member and a shifting ring member 58.

A locking ring 60 mounted in a groove 59 on the hub 56, normally holds the shifting ring and ballbearing member in the position shown in the drawings. Means for shifting the clutch assembly, thus described, are provided and comprise the lever 62 pivotally mounted upon the outside of the housing 16a upon suitable ear members 16b. The ear members carry the pin 64 upon which the lever member 62 is pivoted. The lever 62 may be further provided with the handle portion 66 extending laterally therefrom. This lever is formed with a retaining cup portion 68 adapted to confine a compression spring 71 which normally raises the lever to the position shown in Fig. 1, and disengages the clutch members, as will be hereinafter more clearly described.

The lower ends of lever 62 are formed with a pair of yoke members 70 and 72 which encircle the housing 16a and carry at their lower ends a pair of inwardly projecting pin members 74 and 76 that engage in suitable openings 75 in the shifting ring member 58. The pins may be screw-threadedly mounted in suitable openings in yoke members 70 and 72 and extend through elongated openings 80 and 82 in the side walls of the housing 16a.

The operation of our improved clutch will now be described. When it is desired to secure a drive from the continuously rotating tubular member 39 to the shaft 24, the handle 66 of lever 62 is pressed downwardly, thereby moving driving clutch member 44 forward and bringing the tapered portion 50 of the driving clutch member 44 into engagement with the cone-shaped wall 52 of the clutch member 37. In view of the fact that this clutch member is drivingly connected to the driven clutch member 34 by means of slots 36a which engage the projections 36, the shaft 24 will be frictionally driven by means of the cone and taper arrangement described. Further forward movement of clutch member 44 causes the complementary teeth 35 and 48 to become engaged and the driving and driven clutch members will thus be interlocked, and a direct positive drive will be had. This drive will continue as long as pressure is applied to handle 66 to keep the same pressed downwardly against the housing 16a and the clutch members in interlocked position. When pressure is released upon the handle 66, the spring 71 will return the same to the position shown in Fig. 1, at the same time withdrawing the clutch member 44 from engagement with clutch member 34. As this is withdrawn, the spring member 90 presses the cone-shaped clutch member 37 forward until the same engages in the stationary ring member 92 mounted in the housing 16a, thus providing an effective brake member for the driven clutch member and insuring quick stopping of the driven parts.

From the foregoing description it is believed to be clear that an easy acting and simple clutch mechanism has been provided for providing a comparatively quick engaging or disengaging clutch. We have found by experiment that the action of the clutch is practically as quick as the movement of the hand in lowering or raising lever handle 66, so it can be seen that a very quick-acting clutch has been provided.

While we have illustrated and described a specific embodiment of our invention, it is, of course, understood that we do not wish to limit ourselves to the exact details shown, rather what we desire to secure and protect by Letters Patent of the United States is:

1. In combination with a flexible drive shaft, a housing therefor, a driving clutch member having a forward face, said face having a toothed surface and a tapered friction surface, a driven clutch member having a forward face, said face having a toothed vertical surface and a cone-shaped friction surface whereby engagement of said clutch members operates to provide first a friction engagement and then a locked driving engagement, a hand operated clutch lever pivotally mounted on said housing, a shifting ring movable thereby and a brake member in said housing for stopping movement of said driven clutch member when the same is released.

2. In a power transmitting unit the combination of a housing, a driving flexible shaft mounted therein, a clutch member secured to said shaft, a shifting collar mounted on said clutch member, said clutch member having a tapered friction engaging surface and a toothed engaging surface, a shaft member aligned with said driving shaft, a clutch member secured thereto, said clutch member having a toothed face, an auxiliary clutch member slidably mounted upon said clutch member, said auxiliary clutch member having a cone-shaped friction surface, means comprising a hand lever for operating said shifting collar for moving said driving clutch member forward to engage first said auxiliary clutch member and then said toothed face clutch member and means for yieldingly supporting said auxiliary clutch member in operating position and a brake member adapted to stop said driven clutch member when not in operating position, said member comprising a ring mounted in said housing, and aligned with said auxiliary clutch member, said ring having a concave opening therein.

3. In a power transmitting unit the combination of a driving shaft, a clutch member secured thereto, a shifting collar mounted on said clutch member, said clutch member having a tapered friction engaging surface and a toothed engaging surface, a shaft member aligned with said driving shaft, a driven clutch member secured thereto, said clutch member having a toothed face, an auxiliary clutch member slidably mounted upon said driven clutch member, said auxiliary clutch member having a cone-shaped friction surface, means for moving said driving clutch member forward to engage first said auxiliary clutch member and then said toothed clutch member, means for yieldingly supporting said auxiliary clutch member in operating position, and a brake member comprising a fixed ring member having a conical opening adapted to engage and stop said driven clutch member when not in operating position.

ARTHUR WILLIAM MALL.
THOMAS A. LONG.